United States Patent
Mondello et al.

(10) Patent No.: US 12,489,622 B2
(45) Date of Patent: Dec. 2, 2025

(54) CIRCUIT WITH HARD MACRO PROTECTION AND CORRESPONDING METHOD

(71) Applicant: STMicroelectronics International N.V., Geneva (CH)

(72) Inventors: Antonino Mondello, Messina (IT); Michele Alessandro Carrano, Catania (IT); Riccardo Condorelli, Catania (IT)

(73) Assignee: STMicroelectronics International N.V., Geneva (CH)

( * ) Notice: Subject to any disclaimer, the term of this patent is extended or adjusted under 35 U.S.C. 154(b) by 45 days.

(21) Appl. No.: 18/628,508

(22) Filed: Apr. 5, 2024

(65) Prior Publication Data

US 2024/0356744 A1    Oct. 24, 2024

(30) Foreign Application Priority Data

Apr. 21, 2023  (IT) .................. 102023000007920

(51) Int. Cl.
*H04L 9/08* (2006.01)
*G06F 13/40* (2006.01)

(52) U.S. Cl.
CPC .............. *H04L 9/088* (2013.01); *G06F 13/40* (2013.01)

(58) Field of Classification Search
CPC ....................................................... H04L 9/088
See application file for complete search history.

(56) References Cited

U.S. PATENT DOCUMENTS

| | | | |
|---|---|---|---|
| 11,177,953 B2* | 11/2021 | Zeh | H04L 9/3271 |
| 2014/0156872 A1 | 6/2014 | Buer et al. | |
| 2014/0369495 A1* | 12/2014 | Muchsel | G06F 21/602 380/44 |
| 2023/0050241 A1 | 2/2023 | Yang et al. | |

OTHER PUBLICATIONS

Cha, Meeyoung, et al., "Resource-Constrained Low-Power Bus Encoding with Crosstalk Delay Elimination," Proceedings of the 2004 Asia and South Pacific Design Automation Conference, Jan. 27, 2004, 4 pages.

* cited by examiner

*Primary Examiner* — Simon P Kanaan
(74) *Attorney, Agent, or Firm* — Slater Matsil LLP

(57) ABSTRACT

A circuit implemented as a System-on-Chip (SOC) circuit comprising a microcontroller configured to drive one or more hard macros via a respective communication interface and a shielded bus. The microcontroller configured to transmit over the shielded bus random numbers to the hard macro. The microcontroller and the hard macro configured to use these random numbers as cryptographic shared secret for authentication. The microcontroller configured to drive via the communication interface the hard macros authenticated via the random numbers.

20 Claims, 7 Drawing Sheets

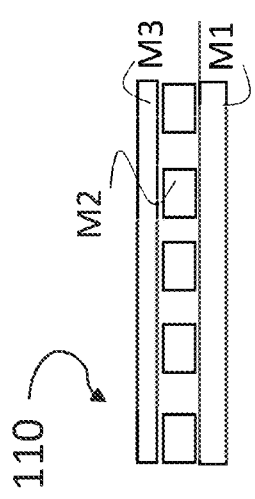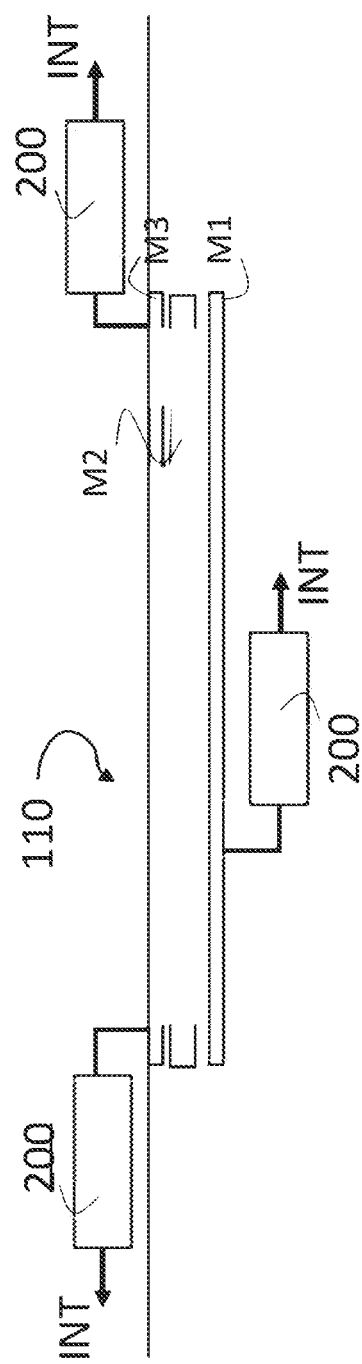

CIRCUIT WITH HARD MACRO PROTECTION AND CORRESPONDING METHOD

CROSS-REFERENCE TO RELATED APPLICATIONS

This application is a translation of and claims the priority benefit of Italian Patent Application No. 102023000007920, filed on Apr. 21, 2023, which is incorporated by reference herein in its entirety.

TECHNICAL FIELD

The description relates to electronic circuits. One or more embodiments can be applied to electronic circuits such as, for instance, System-on-Chip (SOC) circuits containing hard macros.

BACKGROUND

Certain electronic circuits, such as, for instance, System-on-Chip (SOC) circuits, may contain hard macros integrated into the same die. The designation hard macro commonly applies to circuit-level designs optimized for power, area, or timing and are silicon tested. Usually, hard macros are targeted for specific integrated circuits (IC manufacturing technology), and unlike soft macros, which allow users to manipulate the register transfer level (RTL), hard macros only allow accessing their pins without the possibility of modifying their internal structure. Therefore, hard macros are circuits that are generated without using full custom design methodologies and are imported into the physical design database, for instance, as a LEF ("Library Exchange Format") or GDS2 ("Graphic Design System II") file format.

Currently, hard macros, such as Ultra-Wide Band (UWB), Bluetooth Low Energy (BLE), Wi-Fi, etc., are coupled to internal buses, such as Advanced High-Performance Bus (AHB) or Advanced extensible Interface (AXI), etc., using various techniques to grant communication security, such as a Trust Zone or a Resource Isolation Framework.

A Trust Zone is a hardware mechanism implemented in single-core microcontrollers that divides the runtime environment into safe and unsafe functions. In addition, each execution environment contains a Memory Protection Unit (MPU) that can further isolate memory regions as deterrents to potential adversaries attempting to access data resources.

A Resource Isolation Framework involves dividing hardware resources into different compartments of usage during runtime, each of the compartments having an ID number, a CID ("Compartment ID"). Software applications may use RIF to assign hardware resources to processing environments isolating them from each other using hardware isolation boundaries, i.e., the CID. RIF-protected resources may be assigned to a RIF domain at boot time or run-time and some RIF-protected resources may be exclusively assigned, some may be shared, and some may be unassigned. The assignment involves a definition for each master/slave of a CID, and once assigned, (only) masters and slaves with the same CID can communicate while other transactions are refused. Therefore, hardware resources are split into different compartments, and communication between masters and slaves can occur only within each compartment.

A disadvantage of such an approach is the long time between the design phase and the production of resulting devices containing hard macros, as the microcontroller is to be customized to host such hard macros, thus leading to high complexity.

Solutions to simplify the use of hard macros in electronic circuits without giving rise to undesired security issues would be beneficial to reduce production times and maintain/increase communication security.

SUMMARY

An object of one or more embodiments is to contribute to providing such a solution.

According to one or more embodiments, that object is achieved via a circuit (a System-on-Chip (SOC) circuit, for instance) having the features set forth in the claims that follow.

One or more embodiments concern a related method of operation.

The claims are an integral part of the technical teaching provided in respect of the embodiments.

Solutions described herein include architectures capable of managing hard macros as external peripherals, simplifying their management and the design of circuits comprising them.

Exemplary solutions as described herein allow a management of hard macros through standard interfaces, for instance, Security Support Provider Interface (SSPI), Inter-Integrated Circuit (I2C), Improved Inter-Integrated Circuit (I3C), Universal Synchronous Asynchronous Receiver Transmitter (USART), etc., and do not allow the hard macros to access the internal buses of the microcontroller to avoid any undesirable sharing/access of internal resources. Therefore, various embodiments provide for simple, standard, and reusable architectures.

In various embodiments of the present solution, architecture is provided using a secure and independent bus with a small number of lines to share information. Such an additional bus is configured to be driven by the microcontroller and to send information to the hard macros, i.e., hard macros can only receive information from it, thus, creating a secure channel between the microcontroller and the hard macros. For instance, a secure channel may be used to share secure information to authenticate respective hard macros.

Solutions, as described herein, facilitate achieving simple and reusable circuit structures containing hard macros and can detect some malicious activities on the external electrical interfaces of the hard macros.

BRIEF DESCRIPTION OF THE DRAWINGS

One or more embodiments will now be described, by way of example only, with reference to the annexed figures, wherein:

FIG. 3B is a lateral view of an example of a secure and shielded bus line according to embodiments of the present description;

FIG. 3C is a longitudinal view of an example of a secure and shielded bus line with an alarm generation feature according to embodiments of the present description;

Corresponding numerals and symbols in the different figures generally refer to corresponding parts unless otherwise indicated.

The figures are drawn to clearly illustrate the relevant aspects of the embodiments and are not necessarily drawn to scale.

The edges of features drawn in the figures do not necessarily indicate the termination of the extent of the feature.

DETAILED DESCRIPTION OF ILLUSTRATIVE EMBODIMENTS

In the ensuing description one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular configurations, structures, or characteristics may be combined in any adequate way in one or more embodiments.

The headings/references used herein are provided merely for convenience and, hence, do not define the extent of protection or the scope of the embodiments.

For simplicity and ease of explanation, throughout this description, and unless the context indicates otherwise, like parts or elements are indicated in the various figures with like reference signs, and a corresponding description will not be repeated for every figure.

Figure 1:
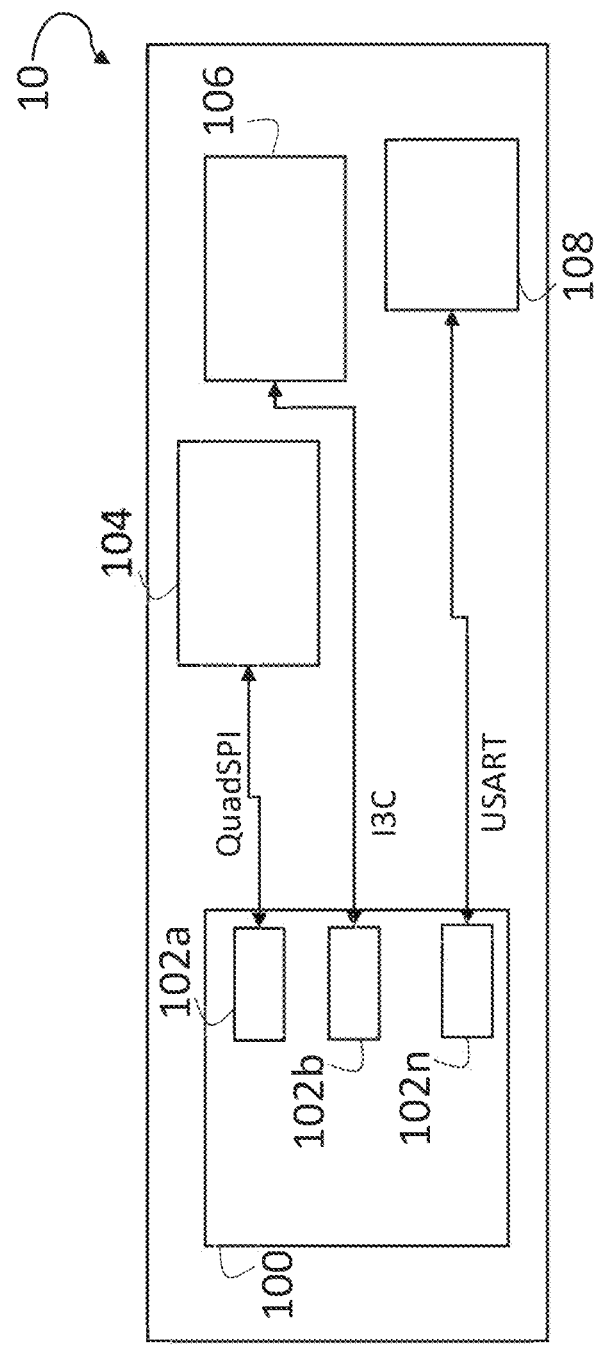
FIG. 1 is a block diagram of a System-on-Chip (SOC) architecture comprising hard macros according to embodiments of the present description.

FIG. 1 is a block diagram of a System-on-Chip (SOC) architecture 10 comprising hard macros 104-108 according to embodiments of the present solution. The introductory portion of this description discusses a commonly accepted meaning of "hard macro" in the art.

In various embodiments, a long time between a previous design phase and the production of resulting devices 10 containing hard macros 104-108 may be taken by customizing microcontrollers 100 to host hard macros 104-108.

That time can be reduced by developing reusable architectures capable of managing hard macros 104-108 as external peripherals through some standard interfaces, for instance, Serial Peripheral Interface (SPI), Inter-Integrated Circuit (I2C), Improved Inter-Integrated Circuit (I3C), Universal Synchronous Asynchronous Receiver Transmitter (USART), etc.

In this regard, System-on-Chip (SOC) architecture 10 as illustrated in FIG. 1 comprises a microcontroller 100 that is configured to drive hard macros 104-108 or to receive information from the same/other hard macros 104-108.

As illustrated, the microcontroller 100 comprises a plurality of standard interfaces 102a, 102b, ..., 102n, indicated as a whole as 102. One or more standard interfaces, for instance, 102a, 102b, or 102n, in the plurality of standard interfaces 102 are configured to enable the communication of the microcontroller 100 with one or more hard macros 104-108, for instance, through cables composed of tens of metal wires.

For instance, one or more standard interfaces in the plurality of standard interfaces 102 that are configured for enabling the communication between the microcontroller 100 and one or more hard macros 104-108 may be a Serial Peripheral Interface (SPI), and more in particular, a Quad-SPI, 102a that is configured to enable the communication between the microcontroller 100 and a hard macro 104, for instance, an Ultra-Wide Band (UWB) modem; an Improved Inter-Integrated Circuit (I3C) 102b that is configured to enable the communication between the microcontroller 100 and a hard macro 106, for instance, a Bluetooth Low Energy hard macro; and a Universal Synchronous Asynchronous Receiver Transmitter (USART) 102n that is configured to enable the communication between the microcontroller 100 and a hard macro 108, for instance, a Wi-Fi hard macro.

In various embodiments, hard macros 104-108 may be configured to be isolated from internal buses, for instance, from a flash memory, a RAM memory, a core, or any other element contained in the microcontroller 100. Hence, in various embodiments, it may be desirable that hard macros 104-108 have no direct access to the internal buses of the microcontroller 100 to avoid any sharing/access of internal resources of the microcontroller 100.

In certain conditions, an embodiment, according to FIG. 1, may be subject to security weaknesses; for instance, such an embodiment may be attacked with a masquerade attack, wherein an adversary may pretend to be one of the hard macros 104-108 by injecting malicious data in the communication interfaces 102 for the microcontroller 100.

Specifically, an adversary may switch off one or more hard macros 104-108 and substitute the messages sent to the communication interfaces by those one or more hard macros 104-108 with malicious messages, injecting a malicious pattern in the microcontroller 100.

Alternatively, the adversary may switch off the microcontroller 100 and substitute the messages sent to the communication interfaces by the microcontroller 100 to one or more hard macros 104-108 with malicious messages, injecting a malicious pattern in those one or more hard macros 104-108.

It is noted that other possible combinations of attacks through switching off and substituting the messages sent to the communication interfaces are possible for an adversary willing to inject malicious data into the microcontroller 100 or one or more hard macros 104-108.

Figure 2:
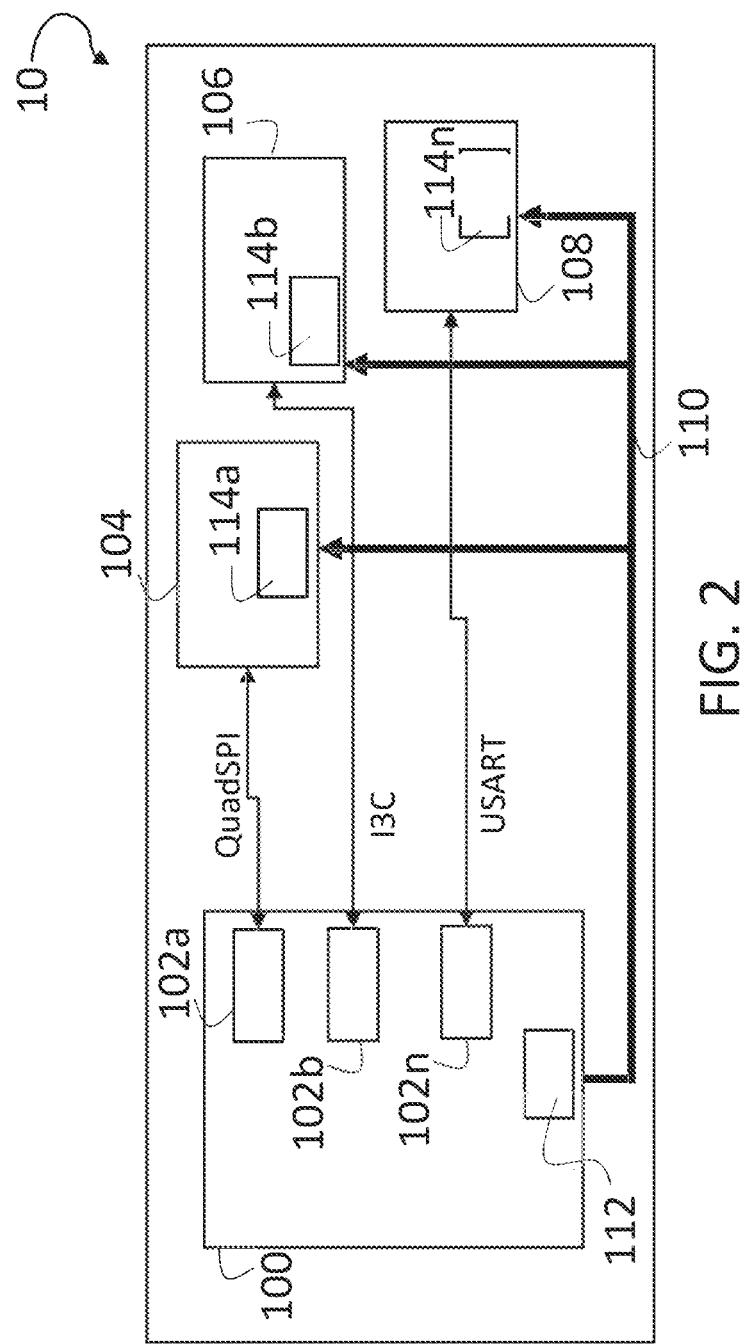
FIG. 2 is a block diagram of a System-on-Chip (SOC) architecture comprising hard macros and equipped with protection mechanisms against malicious attacks according to embodiments of the present description.

FIG. 2 is a block diagram of System-on-Chip (SOC) architecture 10 comprising hard macros 104-108 and equipped with protection mechanisms 110 against malicious attacks according to embodiments of the present solution. Various embodiments, according to FIG. 2, facilitate the detection of some types of malicious activities on the external electrical interfaces of hard macros 104-108. The elements of FIG. 2 that have already been described in FIG.

1 are referenced using the same symbols without repeating for brevity and conciseness in a detailed description.

According to FIG. 2, an embodiment again comprises a microcontroller 100 configured to communicate with one or more hard macros 104-108 through one or more standard interfaces in a plurality of standard interfaces 102.

Embodiments, as exemplified in FIG. 2, further comprise a secure bus 110 with fewer lines, for instance, between one and three. This secure bus 110 is configured to share information that may be used to protect from malicious attacks communications between the microcontroller 100 and one or more hard macros 104-108. The secure bus 110 is configured to receive from the microcontroller 100 information comprising commands to drive one or more hard macros 104-108. The hard macros 104-108 are instead configured only to receive such information from the secure bus 110 and may not be configured to send information on such secure bus 110.

In this regard, the microcontroller 100 can be equipped with a Bus Interface Master (BIM) 112, while one or more hard macros 104-108 are equipped with a Bus Interface Slave (BIS), labeled as a whole with 114.

The secure bus 110 may be independent and not connected to the internal interconnections of both the microcontroller 100 and the hard macros 104-108. Therefore, the microcontroller 100 and at least one hard macro 104-108 may include respective internal interconnections, and the shielded bus 110 may be exempt from coupling to said respective internal interconnections.

Figure 3A:
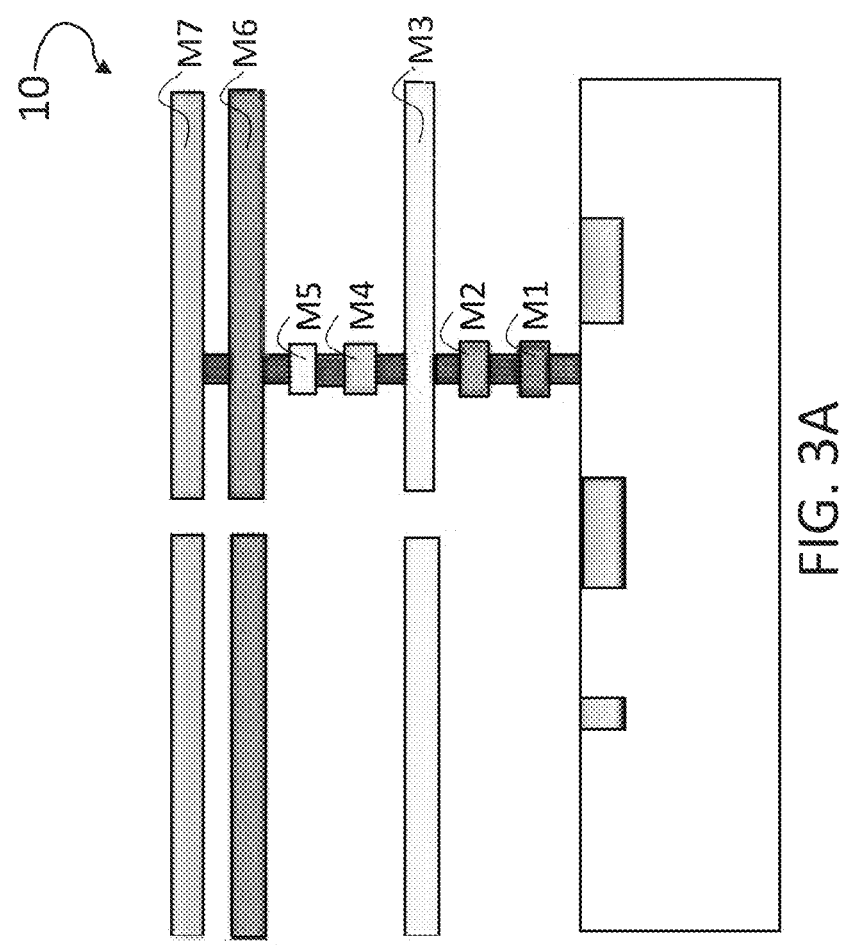
FIG. 3A is a lateral view of an example of the metal layers of a System-on-Chip (SOC) architecture according to embodiments of the present description.

To be secured from attacks, the secure bus 110 may be further shielded and routed with low metal layers, for instance, layers M1, M2, and M3 of FIG. 3A. For instance, as shown in FIG. 3B, the lower layer M1 and layer M3 may shield layer M2, which comprises the bus lines. Therefore, circuit 10 may comprise buried metal layers; for instance, the layers M1, M2, M3, and the shielded bus 110 may be routed over said buried metal layers; for instance, the lower layer M1 and the layer M3 may provide the shielding of the layer M2 that comprises the bus lines.

The shielding M1, M3 of the secure bus 110 provides mechanical protection against direct access to such a bus 110, for instance, protection against access with a microprobe. In addition, the shielding M1, M3 may provide further protection against electromagnetic attacks by using the principle of Faraday's cage.

In various embodiments, the secure bus 110 may also be protected in other ways. For instance, FIG. 3C is a longitudinal view of an example of a secure and shielded bus line 110 with an alarm generation feature 200 according to the embodiments of the present solution.

Figure 4:
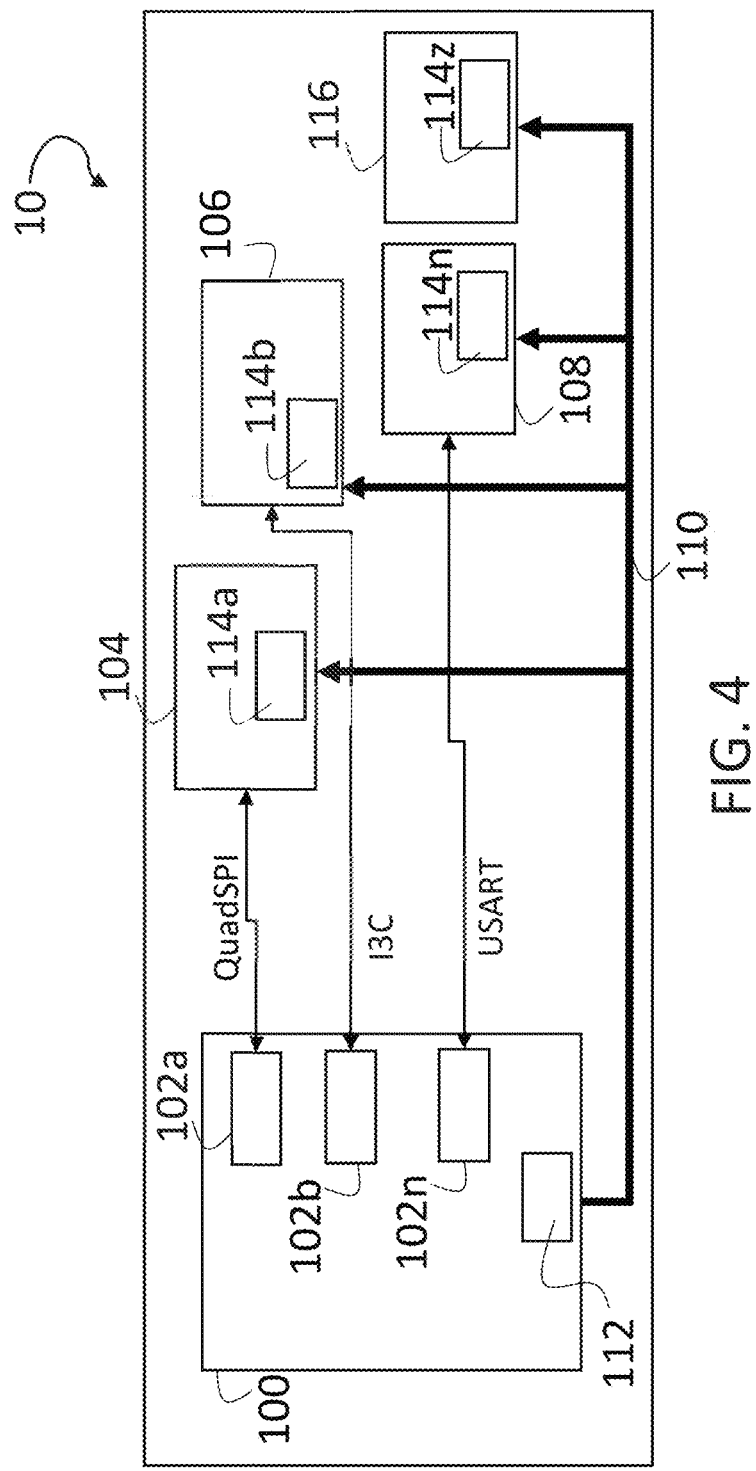
FIG. 4 is a block diagram of a System-on-Chip (SOC) architecture comprising hard macros and equipped with protection mechanisms against malicious attacks and attacks to a secure and shielded bus line according to embodiments of the present description.

The alarm of FIG. 3C is generated in case of attacks to the secure and shielded bus line 110 in embodiments with the architecture of FIG. 4. FIG. 4 is a block diagram of a System-on-Chip (SOC) architecture 10 comprising hard macros 104-108 and equipped with protection mechanisms 110, 116 against malicious attacks and attacks to a secure and shielded bus line 110 according to embodiments of the present solution.

The elements of FIG. 4 that have already been described are referenced using the same symbols, and a detailed description will not be repeated for brevity and conciseness.

An embodiment, according to FIG. 4, again comprises a microcontroller 100 configured to communicate with one or more hard macros 104-108 through one or more standard interfaces in a plurality of standard interfaces 102. In addition, such microcontroller 100 may be configured to send (through a secure bus 110, for instance, through a Bus Interface Master, BIM 112) information to the hard macros 104-108 that are configured to receive such information through a Bus Interface Slave (BIS) 114.

Additionally, according to FIG. 4, embodiments comprise a Power Management Unit (PMU) 116 coupled to the secure bus 110 through a dedicated Bus Interface Slave (BIS) 114z. The Power Management Unit 116 may be configured to supply the lower layer M1 or layer M3 with a voltage $V_{dd}$, different from zero (reference to FIG. 3C).

Moreover, according to FIG. 4, embodiments comprise one or more detector circuits 200 (a reference to FIG. 3C) coupled to the secure bus 110, particularly to the lower layer M1 or layer M3. The detector circuit 200 is configured to detect when an interruption in the voltage $V_{dd}$ supplied to the lower layer M1 or layer M3 by the Power Management Unit 116 is present. In case of detection of an interruption in such voltage $V_{dd}$, the detector circuit 200 may be configured to raise an alarm, for instance, an interrupt to the microcontroller 100 or one or more hard macros 104-108.

Figure 3D:
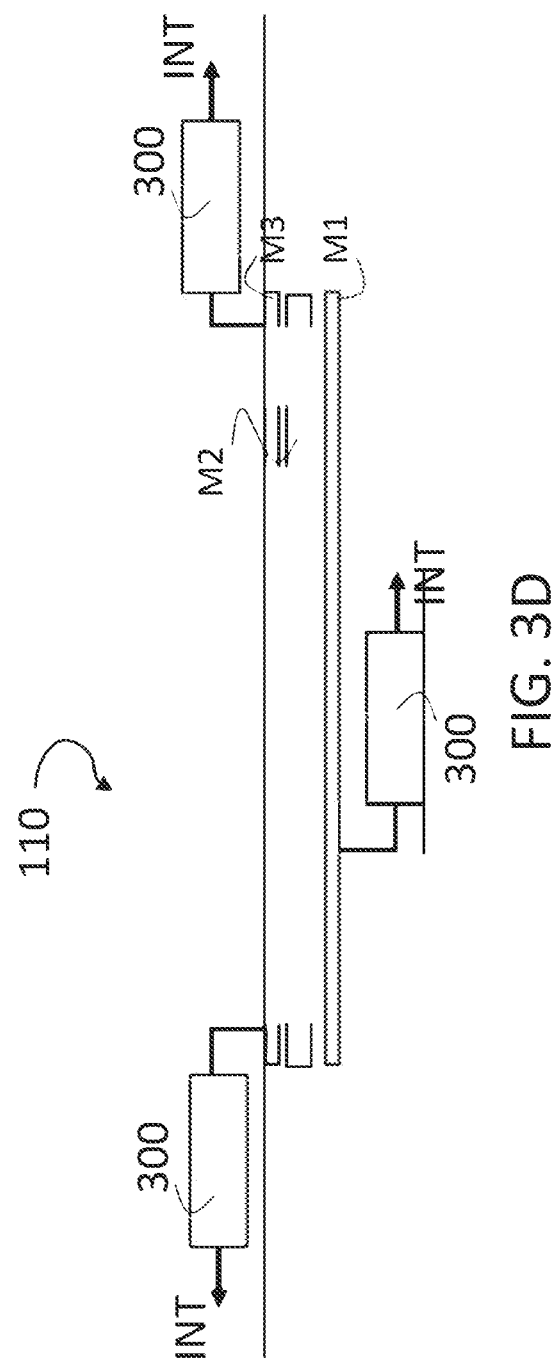
FIG. 3D is a longitudinal view of an example of a secure and shielded bus line with a different alarm generation feature according to embodiments of the present description.

Alternatively, the Power Management Unit 116 may be configured to supply the lower layer M1 or layer M3 with a low-rate variable signal. In that case, embodiments according to FIG. 4 further may comprise, instead of detector circuit 200 (reference to FIG. 3C), one or more wave detector circuit 300 (reference to FIG. 3D) that are coupled to the secure bus 110, in particular, to the lower layer M1 or the layer M3. The wave detector circuit 300 is configured to detect when an interruption or a frequency variation in the low-rate variable signal supplied to the lower layer M1 or layer M3 by the Power Management Unit 116 is present. When detecting an interruption or a frequency variation in such low-rate variable signal, the wave detector circuit 300 may be configured to raise an alarm, for instance, an interrupt to the microcontroller 100 or one or more hard macros 104-108.

In various embodiments, the information on the secure bus may be further protected by using correction codes or encryption.

Figure 3E:
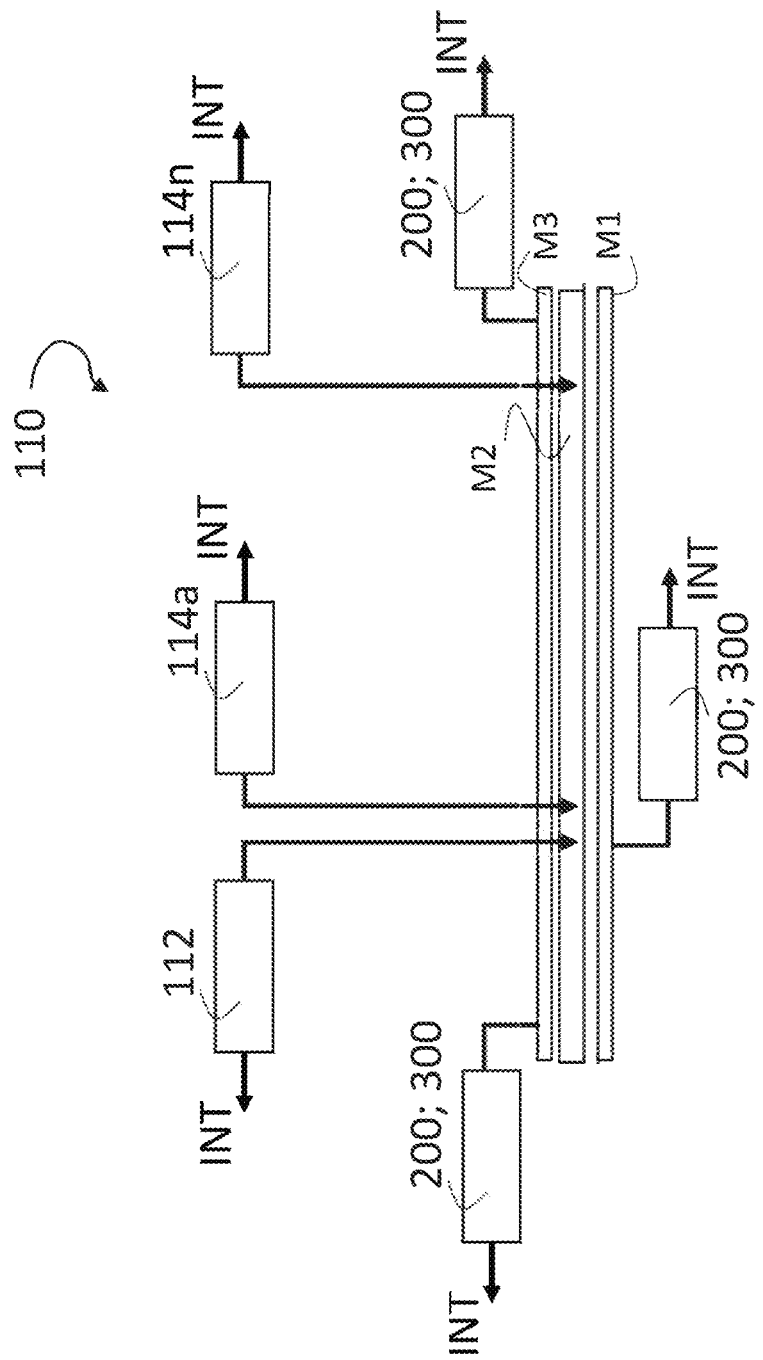
FIG. 3E is a longitudinal view of an example of a secure and shielded bus line with an alarm generation feature for electromagnetic disturbances according to embodiments of the present description.

Therefore, in addition to the previously described ways of protecting the secure bus 110, a further alarm may be generated in case of detection of electromagnetic attacks on it (reference to FIG. 3E).

In FIG. 3E the structure for detecting electromagnetic attacks to the secure bus 110 is exemplified with reference to an embodiment comprising the detector circuit 200 or the wave detector circuit 300. It is noted that the structure for detecting electromagnetic attacks can be implemented independently, i.e., in a self-sufficient way.

The secure bus 110 may be shielded to be resilient to external electromagnetic forces.

The messages' correctness during communication may be further checked by the Bus Interface Master (BIM) 112 of the microcontroller 100 or by a Bus Interface Slave (BIS) 114 of one or more hard macros 104-108.

For instance, the correctness of any message in a communication may be checked by using a double transmission, parity bits, or any other form of error-detecting code.

In various embodiments, in case of detection of errors in a communication message, the Bus Interface Master (BIM) 112 of the microcontroller 100 or a Bus Interface Slave (BIS) 114 of one or more hard macros 104-108 may be configured to raise an alarm, for instance, an interrupt to the microcontroller 100 or one or more hard macros 104-108.

The architecture modifications of FIG. 2 may allow several different security schemes, adding flexibility in the configuration of the microcontroller 100 to detect various types of attacks.

Specifically, the secure bus 110 is used to transmit from the microcontroller 100 to the one or more hard macros 104-108 a secret random number R that is generated by the microcontroller 100, for instance, using a Random Number Generator (RNG), for instance, a pseudo-random number generator of any type known in the art.

Such secret random number R is used as a cryptographic shared secret, i.e., a piece of data known only to the parties involved in a secure communication such as a password, a passphrase, a big number, or an array of randomly chosen bytes, between the microcontroller 100 and the one or more hard macros 104-108.

Thus, the secret random number R may be used for authenticating the microcontroller 100 or the one or more hard macros 104-108 to the other party in the communication, i.e., the one or more hard macros 104-108 and the microcontroller 100, respectively.

To summarize, circuit 10, for instance, a System-on-Chip (SOC), may comprise: a microcontroller 100 configured to drive at least one hard macro 104-108 via a respective communication interface 102, for instance, a standard communication interface, and a shielded M1, M3 bus 110, M2, wherein the microcontroller 100 may be configured to transmit over the shielded bus 110 at least one random number R, for instance, generated by the microcontroller 100 by using a Random Number Generator, to the at least one hard macro 104-108, the microcontroller 100 and the at least one hard macro 104-108 may be configured to use the at least one random number R as a cryptographic shared secret for authentication, and the microcontroller 100 may be configured to drive via the respective communication interface 102 the at least one hard macro 104-108 authenticated via the at least one random number R.

Different authentication methods may be used, for instance, a challenge-response method or a method wherein the secret random number R may be fed to a key derivation function, for instance, any cryptographic function, to produce one or more keys used to encrypt messages. In this last case, it is possible to make a unique session, thus, avoiding replay attacks, by applying the key derivation function on both the secret random number R used as shared secret and an initialization vector, IV, for instance, the payload of a message to be transmitted.

For example, in various embodiments, a possible security scheme may comprise the following steps: at each power-up of architecture 10, the microcontroller 100 is configured to generate a secret random number R, for instance, by using a Random Number Generator (RNG), for instance, a pseudo-random number generator of any type known in the art; the microcontroller 100 is configured to transmit, through the Bus Interface Master (BIM) 112, the secret random number R on the secure bus 110 to one or more hard macros 104-108; the one or more hard macros 104-108, once completed their respective power cycle, for instance, after a reset operation, are configured to receive, through the respective Bus Interface Slave (BIS) 106, the secret random number R and to communicate to the microcontroller 100, through the respective standard communication interface 102, that the secret random number R has been correctly received by sending a value S obtained as a function of such secret random number R; and the microcontroller 100 is configured to verify the correctness of the secret random number R by considering the received value S obtained as a function of such secret random number R in one or more hard macros 104-108.

The step wherein one or more hard macros 104-108 communicate to the microcontroller 100, through the respective standard communication interface 102, that the secret random number R has been correctly received may be done by sending on such respective standard communication interface 102 a packet of information containing a value S corresponding to any cryptographic function applied to the secret random number R, for instance, the value S may be the Cyclic Redundancy Check (CRC) of the secret random number R, or the HASH value of the secret random number R. In this way, the secret random number R is never exposed on the standard communication interfaces 102, remaining secret for any adversary listening to the communication.

Similarly, the step wherein the microcontroller 100 verifies the correctness of the secret random number R is done by computing the value S within the microcontroller 100 using the same cryptographic function, also applied by the hard macros 104-108, on the secret random number R, for instance, the value S may be the Cyclic Redundancy Check (CRC) of the secret random number R, or the HASH value of the secret random number R, and comparing the computed value S with the one received from such one or more hard macros 104-108 through such respective standard communication interface 102.

In the last step, if the microcontroller 100 verifies the correctness of the secret random number R, for instance, through a successful comparison of the computed value S with the one received from such one or more hard macros 104-108 through such respective standard communication interface 102, i.e., the computed value S is equal to the received value S, the one or more hard macros 104-108 responsible of sending such packet of information containing the value S are considered reliable and not under attack, i.e., the microcontroller 100 finalizes the authentication of such one or more hard macros 104-108. Such one or more hard macros 104-108 that are considered reliable become part of the peripherals managed by the microcontroller 100 and are controlled and operated through control messages sent over the respective standard interface 102.

Conversely, if the microcontroller 100 detects that the secret random number R is not correct, for instance, by failing to compare the computed value S with the one received from such one or more hard macros 104-108 through such respective standard communication interface 102, i.e., the computed value S is different from the received value S, the one or more hard macros 104-108 responsible of sending the wrong packet of information containing the wrong value S are not considered as part of the original architecture and are considered under attack by a malicious user, i.e., the authentication of such one or more hard macros 104-108 is aborted.

To summarize, at least one hard macro 104-108 may be configured to send via the respective communication interface 102 to the microcontroller 100 a data packet in response to the reception of the random number R from the microcontroller 100, wherein the data packet may contain at least one value S obtained by applying a cryptographic function, for instance, the Cyclic Redundancy Check (CRC) or the HASH function, to the random number R, and the microcontroller 100 may be configured to: verify the correctness of the received value S by applying the same cryptographic function, for instance, the same Cyclic Redundancy Check (CRC) or the same HASH function, to the random number R, obtaining a second value S, and comparing the received value S with the second value S, if the received value S is equal to the second value S, the authentication of at least one hard macro 104-108 is finalized, i.e., at least one hard macro 104-108 is not under attack and is considered reliable, and if the received value S is different from the second value S, authentication of at least one hard macro 104-108 is aborted, i.e., at least one hard macro 104-108 is considered under attack and, for instance, is decoupled by the circuit 10.

In various embodiments, the microcontroller 100 may be configured to send the secret random number R again or a new random number R if an answer from one or more hard macros 104-108 is not received within an answer time limit.

In various embodiments, one or more hard macros 104-108 may be configured to request to the microcontroller 100 to send again the secret random number R, or a new random number R, absent reception of a random number R within a receipt time limit.

The answer and receipt time limits may have the same or different values.

In various embodiments, the microcontroller 100 may be configured to issue a renewed secret random number R after a renewal issue time.

In various embodiments, one or more hard macros 104-108 may be configured to request to the microcontroller 100 a renewed secret random number R after a renewal request time.

The renewal issue time and the renewal request time may have the same or different values. The renewal issue time and the renewal request time may have the same value as the answer time limit or the receipt time limit or may have different values.

In various embodiments, the microcontroller 100 may be configured to send a different secret random number R for each hard macro 104-108 to provide each hard macro 104-108 with a customized secret random number R.

In various embodiments, one or more hard macros 104-108 may be configured to request that the microcontroller 100 receive a different secret random number R to customize the secret random number R.

In various embodiments, the communication data on the secure bus 110 may be encrypted. In this case, the microcontroller 100 is configured to transmit, through the Bus Interface Master (BIM) 112, an encrypted version of the secret random number R on the secure bus 110. The encrypted version of the secret random number R has the same purpose as the secret random number R, as explained above, and it is decrypted by the hard macros 104-108 before the computation of the value S to be sent in the packet of information for the microcontroller 100.

Suppose the communication data on the secure bus 110 are encrypted. In that case, the encryption done by the microcontroller 100 and the decryption done by one of the one or more hard macros 104-108 may be done if both the microcontroller 100 and one of the one or more hard macros 104-108 share complementary cryptographic keys, i.e., complementary encryption and decryption keys. In this case, the microcontroller 100 and one of one or more hard macros 104-108 may use one of the cryptographic keys already shared between them for other purposes.

The complementary cryptographic keys, i.e., complementary encryption and decryption keys, may be shared between the microcontroller 100 and a plurality of hard macros 104-108, i.e., a plurality of hard macros 104-108 share the same decryption key, or may be shared between the microcontroller 100 and one of the one or more hard macros 104-108, i.e., the microcontroller 100 may use a plurality of encryption keys, i.e., an encryption key for each hard macro, and the decryption keys are different for each hard macro in the one or more hard macros 104-108.

To summarize, the shielded bus 110 may be configured to transmit encrypted data, and the microcontroller 100 and at least one hard macro 104-108 are configured to share complementary encryption and decryption keys with an encryption key used by the microcontroller 100 to encrypt data transmitted on the shielded bus 110, and a complementary decryption key used by the at least one hard macro 104-108 to decrypt data received over the shielded bus 110.

In various embodiments, the encrypted communication may be used between the microcontroller 100 and a subset of one or more hard macros 104-108, while the communications between the microcontroller 100 and hard macros not included in such subset are not encrypted.

The secret random number R may also be used, both in the microcontroller 100 and in one or more hard macros 104-108, as a seed for generating a pseudo-random number through a Random Number Generator (RNG), for instance, a pseudo-random number generator of any type known in the art.

In this case, during any communication between the microcontroller 100 and one of the one or more hard macros 104-108 over a respective standard communication interface 102, the following operations are performed: the entity that acts as a transmitter in the communication generates a new pseudo-random number from a sequence of pseudo-random numbers obtained using the secret random number R as seed of a pseudo-random number generator; the entity that acts as a transmitter in the communication merges the new pseudo-random number with the payload of a message to be transmitted, forming an extended payload; the entity that acts as a transmitter in the communication transmits the extended payload over the respective standard communication interface 102; and the entity that acts as a receiver in the communication accepts the extended payload only if such extended payload contains the expected new pseudo-random number, i.e., the authentication procedure is finalized. Such pseudo-random number is locally generated and, specifically, is obtained from the same sequence of pseudo-random numbers that is shared between the transmitter entity and the receiver entity since both the pseudo-random number generator and the secret random number R used as the seed of such pseudo-random number generator are shared between them.

In various embodiments, if a wrong new pseudo-random number is detected by the entity that acts as a receiver in the communication, i.e., the authentication procedure is aborted. Such receiver entity raises an alarm, for instance, an interrupt, since the transmitter could be under attack, i.e., switched off.

By using the secret random number R as the seed for generating a pseudo-random number through a Random Number Generator (RNG), as explained above, it is possible to avoid replay attacks, wherein a valid transmission of data is maliciously or fraudulently repeated or delayed by an adversary who intercepts such data and retransmits them, for instance, to overcome an authentication procedure by reusing past data that were originally sent by an authorized entity. Specifically, such replay attacks are avoided since the expected new pseudo-random number is different at each transaction. Thus, the reuse of past packets may be easily detected.

In certain embodiments, instead of using the secret random number R as the seed for generating a pseudo-random number through a Random Number Generator (RNG) as explained above, the secret random number R may be provided as input to a more complicated function that generates an extended pseudo-random number $RNG_{ext}$ as a function, for instance, of the result of a Random Number Generator $RNG_k$, using the secret random number R as a seed, or of a payload p of a message which is used as the initialization vector, IV: $RNG_{ext}=f(p,RNG_k(R))$. Examples of more complicated functions may be: $RNG_{ext}=CRC(RNG_k(R))$, wherein CRC is the Cyclic Redundancy Check function, $RNG_{ext}=CRC(p,RNG_k(R))$, wherein $RNG_{ext}$ depends also on the payload p of a message, $RNG_{ext}=SHA256(p,RNG_k(R))$, wherein SHA256 is the Secure Hash Algorithm with an internal state block size of 256 bits, or any other cryptographic function may be considered.

By using these more complex functions, it is possible to maintain protection against replay attacks since the value of $RNG_{ext}$ is obtained through functions, such as any cryptographic function, whose output values are different at each transaction.

To summarize, the microcontroller 100 and at least one hard macro 104-108 may be configured to use a current value of the random number R to compute the next pseudo-random number.

The one of the microcontroller 100 and at least one hard macro 104-108 acting as a transmitter during a communication between the microcontroller 100 and at least one hard macro 104-108 through the respective communication interface 102 may be configured to merge the next pseudo-random number computed at the transmitter with data to be transmitted, for instance, with the payload of a message to be transmitted.

The other of the microcontroller 100 and at least one hard macro 104-108 acting as a receiver during the communication between the microcontroller 100 and the at least one hard macro 104-108 through the respective communication interface 102 may be configured to accept the transmitted data, i.e., the payload of the message to be transmitted merged with the next pseudo-random number, if the transmitted data comprise a next pseudo-random number computed at the transmitter that is equal to the next pseudo-random number computed at the receiver, i.e., the authentication procedure is finalized and the at least one hard macro 104-108 is considered reliable.

Conversely, the authentication may be considered aborted, i.e., at least one hard macro 104-108 is considered under attack in response to the next pseudo-random number computed at the transmitter being different from the next pseudo-random number computed at the receiver.

The microcontroller 100 and the at least one hard macro 104-108 may be configured to compute a respective next pseudo-random number by using the random number R as a seed in a pseudo-random number generator, for instance, any type of pseudo-random number generator known in the art, to generate a shared sequence of pseudo-random numbers, with the microcontroller 100 and the at least one hard macro 104-108 configured to select a respective next pseudo-random number in the shared sequence of pseudo-random numbers.

In various embodiments, the microcontroller 100 and the at least one hard macro 104-108 may be configured to compute a respective next pseudo-random number by applying the same cryptographic function, for instance, a Cyclic Redundancy Check function or a Secure Hash Algorithm, to the random number R or to a combination of the random number R and the data to be transmitted, for instance, with the payload of a message to be transmitted.

Solutions described herein facilitate managing hard macros through standard interfaces, providing simple, standard, and reusable architectures. In addition, in various embodiments, architecture may be further secured through a secure and independent bus that adds protection against various types of malicious attacks, wherein the additional bus is configured to be driven by the microcontroller and to send information to the hard macros, thus, creating a secure channel between the microcontroller and the hard macros.

Thus, solutions, as described herein, facilitate providing simple and reusable circuit structures containing hard macros that are capable of detecting malicious activities on the external electrical interfaces of the hard macros.

Without prejudice to the underlying principles, the details and the embodiments may vary, even significantly, with respect to what has been described by way of example only without departing from the scope of the embodiments.

The extent of protection is determined by the annexed claims.

What is claimed is:

1. A circuit, comprising:
   a shielded bus; and
   a microcontroller coupled to a hard macro through the shield bus, the microcontroller configured to:
      transmit a random number to the hard macro over the shielded bus, the random number used by the microcontroller and the hard macro as a cryptographic shared secret for authentication, and
      drive the hard macro that is authenticated using the random number via a communication interface different from the shielded bus.

2. The circuit of claim 1, further comprising the hard macro, wherein the hard macro is configured to transmit a data packet to the microcontroller via the communication interface in response to receiving the random number, wherein the data packet contains a value obtained by applying a cryptographic function to the random number.

3. The circuit of claim 2, wherein the microcontroller is further configured to:
   verify the correctness of the value by applying the same cryptographic function to the random number to obtain a second value and comparing the value with the second value,
   wherein, in response to the value being equal to the second value, authentication of the hard macro is finalized, and
   wherein, in response to the value being different from the second value, the authentication of the hard macro is aborted.

4. The circuit of claim 3, wherein an alarm is raised to the microcontroller, hard macro, or both, in response to the authentication of the hard macro being aborted.

5. The circuit of claim 1, wherein the microcontroller and the hard macro are configured to use a current value of the random number to compute a next pseudo-random number, wherein one of the microcontroller and the hard macro act as a transmitter by merging the next pseudo-random number computed at the transmitter with data to be transmitted, and wherein the other one of the microcontroller and the hard macro act as a receiver to accept the data in response to the next pseudo-random number merged with the data being equal to the next pseudo-random number computed at the receiver, and wherein the authentication of the hard macro is aborted in response to the next pseudo-random number merged with the data being different from the next pseudo-random number computed at the receiver.

6. The circuit of claim 5, wherein the microcontroller and the hard macro are configured to compute a respective next pseudo-random number by:
   using the random number as a seed in a pseudo-random number generator to generate a shared sequence of pseudo-random numbers, wherein the microcontroller and the hard macro are configured to select a respective next pseudo-random number in the shared sequence of pseudo-random numbers, or applying a same cryptographic function to the random number or a combination of the random number and the data to be transmitted.

7. The circuit of claim 1, wherein the microcontroller is configured to transmit a new random number absent an answer from the hard macro received within an answer time limit, or wherein the hard macro is configured to request a new random number sent from the microcontroller absent reception of a random number within a receipt time limit.

8. The circuit of claim 1, wherein the microcontroller is configured to issue a renewed random number after a renewal issue time, or wherein the hard macro is configured to request a renewed random number from the microcontroller after a renewal request time.

9. The circuit of claim 1, wherein the shielded bus is configured to transmit encrypted data, and wherein the microcontroller and the hard macro are configured to share complementary encryption and decryption keys with an encryption key used by the microcontroller to encrypt data transmitted on the shielded bus and share a complementary decryption key used by the hard macro to decrypt data received over the shielded bus.

10. The circuit of claim 1, further comprising:
a voltage supply configured to supply a supply voltage to one shield layer of the shielded bus; and
a supply voltage detector circuit coupled to a shield layer of the shielded bus, the supply voltage detector circuit configured to detect an anomaly in response to an interruption of the supply voltage to the shield layer of the shielded bus.

11. The circuit of claim 1, further comprising:
a voltage supply configured to supply a variable supply voltage having a supply frequency, the variable supply being supplied to a shield layer of the shielded bus; and
a supply voltage detector circuit coupled to the shield layer of the shielded bus, wherein the supply voltage detector circuit is configured to detect an anomaly in response to a variation in the supply frequency of the variable voltage supplied to the shield layer of the shielded bus.

12. The circuit of claim 11, wherein the supply voltage detector circuit is configured to raise an alarm to the microcontroller or the hard macro in response to detecting the anomaly.

13. The circuit of claim 1, wherein the shielded bus is configured to transmit data with error detecting codes, and wherein the microcontroller or the hard macro is configured to exchange an alarm in response to an error detected in the data with error detecting codes.

14. The circuit of claim 1,
wherein the microcontroller and the hard macro include respective internal interconnections, wherein the shielded bus is exempt from coupling to the respective internal interconnections of the microcontroller and the hard macro; or
wherein the circuit comprises buried metal layers, wherein the shielded bus is routed over the buried metal layers; or
wherein the circuit is implemented as a System-on-Chip (SOC) circuit comprising the microcontroller, the hard macro, and the shielded bus.

15. The circuit of claim 1, further comprising a plurality of hard macros, wherein the microcontroller is configured to transmit over the shielded bus a respective customized random number to each of the plurality of hard macros, wherein the microcontroller and the plurality of hard macros are configured to use the respective customized random number as cryptographic shared secrets for authentication, and wherein the microcontroller is configured to drive the plurality of hard macros authenticated via the respective customized random number through the communication interface.

16. A method, comprising:
producing, by a microcontroller, a random number;
transmitting, by the microcontroller, the random number to a hard macro over a shielded bus, wherein the microcontroller and the hard macro use the random number as cryptographic shared secret for authentication; and
driving, by the microcontroller, the hard macro authenticated using the random number via a communication interface different from the shielded bus.

17. The method of claim 16, further comprising transmitting, by the hard macro, a data packet to the microcontroller via the communication interface in response to receiving the random number, wherein the data packet contains a value obtained by applying a cryptographic function to the random number.

18. The method of claim 17, further comprising:
verifying, by the microcontroller, the correctness of the value by applying the same cryptographic function to the random number to obtain a second value and comparing the value with the second value,
wherein, in response to the value being equal to the second value, authentication of the hard macro is finalized, and
wherein, in response to the value being different from the second value, the authentication of the hard macro is aborted.

19. A system-on-chip circuit, comprising:
a plurality of hard macros;
a shielded bus; and
a microcontroller coupled to each hard macro through the shield bus, the microcontroller configured to:
transmit a customized random number to each hard macro over the shielded bus, the customized random number used by the microcontroller and each hard macro as a cryptographic shared secret for authentication,
drive each hard macro authenticated using the customized random number via a communication interface different from the shielded bus, and
generating an alarm in response to the authentication of a hard macro being aborted.

20. The system-on-chip circuit of claim 19, wherein the microcontroller and each hard macro are configured to use a current value of the customized random number to compute a next customized pseudo-random number, wherein one of the microcontroller and a respective hard macro act as a transmitter by merging the next customized pseudo-random number computed at the transmitter with data to be transmitted, and wherein the other one of the microcontroller and the respective hard macro act as a receiver to accept the data in response to the next customized pseudo-random number merged with the data being equal to the next customized pseudo-random number computed at the receiver, and wherein the authentication of the respective hard macro is aborted in response to the next customized pseudo-random number merged with the data being different from the next customized pseudo-random number computed at the receiver.

* * * * *